United States Patent [19]

Cassens, Jr.

[11] 4,244,744
[45] Jan. 13, 1981

[54] REFRACTORY GUN MIX

[75] Inventor: Nicholas Cassens, Jr., Pleasanton, Calif.

[73] Assignee: Kaiser Aluminum & Chemical Corporation, Oakland, Calif.

[21] Appl. No.: 64,312

[22] Filed: Aug. 6, 1979

[51] Int. Cl.$^3$ .................. C04B 35/04; C04B 35/42
[52] U.S. Cl. .............................. 106/58; 106/59; 106/84
[58] Field of Search ............ 106/77, 84, 58, 59

[56] References Cited

U.S. PATENT DOCUMENTS

| | | | |
|---|---|---|---|
| 1,287,995 | 12/1918 | Holley | 106/84 |
| 2,883,723 | 4/1959 | Moore et al. | 106/77 |
| 3,642,503 | 2/1972 | Beaney | 106/77 |
| 3,837,872 | 9/1974 | Conner | 106/77 |
| 4,168,177 | 9/1979 | Indelicato et al. | 106/84 |

*Primary Examiner*—James Poer
*Attorney, Agent, or Firm*—Paul E. Calrow; Malcolm McQuarrie

[57] ABSTRACT

A refractory gun mix of improved properties, particularly low rebound, wide water range, and good adherence when gunned onto hot surfaces, used a bonding system of from 1 to 5% sodium silicate, 0.3 to 3% gypsum, and 0 to 5% bentonite, the percentages being based on the total weight of the composition. The gun mix may contain other materials, for example pulverized pitch.

6 Claims, No Drawings

REFRACTORY GUN MIX

BACKGROUND OF THE INVENTION

This invention pertains to refractory gun mixes containing refractory aggregate and sodium silicate bond.

Gun mixes with various bonding systems are well-known, but the industry continues to seek mixes with better properties, for example lower rebound, a wider water range, and better adherence when gunned onto a hot furnace wall. Also, the conventional bonding systems, while adequate with older types of refractory grains, have been found not to be adequate to bond newer types of grains, for example prereacted magnesia-chrome grain, either sintered or fused. Specifically, it was found that although sodium silicate is a very common bond, it did not work well (e.g., there was excessive rebound) with a prereacted magnesia-chrome grain. It is to the solution of this problem of finding a better bond for a gun mix that the present invention is directed.

SUMMARY OF THE INVENTION

It has now been found, according to this invention, that an improved refractory gun mix results if the gun mix consists essentially of from 1 to 5% sodium silicate, from 0.3 to 3% gypsum, and 0 to 5% bentonite, the balance being refractory aggregate, all percentages being based on the total weight of the composition.

Although it is known to add gypsum as a setting agent for sodium silicate (see U.S. Pat. No. 3,837,872, which discloses a method of treating liquid and semi-liquid wastes to render them non-polluting) and plaster of paris ($CaSO_4.\frac{1}{2}H_2O$) to sodium silicate in an acid resisting cement (see U.S. Pat. No. 1,287,995), the addition of gypsum ($CaSO_4.2H_2O$) to sodium silicate bonded gun mixes is not disclosed or suggested by the prior art.

DETAILED DESCRIPTION

The aggregate used in the gun mix of this invention can be any of various well-known materials, for example, periclase, chrome ore, prereacted periclase-chrome grain, dolomite, aluminosilicate aggregate such as calcined fireclay, calcined bauxite, or tabular alumina, and even crushed reject brick. The invention has been found to be particularly useful when applied to basic aggregates such as lime or dolomite or other magnesia-containing aggregates. By the term "magnesia-containing" is meant an aggregate containing at least 10% by weight MgO. Of course, such aggregate can contain up to 98% or more MgO. This invention has been found to be particularly useful with prereacted aggregates such as sintered or fused cast magnesia-chrome. Such prereacted aggregates are known to be less reactive with bonding materials, and it is one of the advantages of the present invention that it is possible to achieve very low rebound rates (i.e., very fast bonding) when such aggregates are gunned.

Although sometimes in refractories technology a distinction is made between the terms "magnesia-chrome" and "chrome-magnesia", the first named component being intended to be the predominant material in the mixture, in the present specification and claims the term "magnesia-chrome" is used to include prereacted grain wherein chrome ore may be the dominant ingredient. Such prereacted grains are well-known in the art.

The sodium silicate used may be any of various well-known types. It will be used dry and in finely divided form. However, as is generally known, sodium silicates with lower $SiO_2:Na_2O$ ratio set faster, and will accordingly generally be preferred where the introduction of slightly larger amounts of $Na_2O$ (as compared to the use of sodium silicates with higher $SiO_2:Na_2O$ ratios) would not be objectionable from the point of view of the refractoriness of the composition.

Bentonite is a well-known clay material which is commonly added to gun mixes (as well as other refractory compositions) to impart stickiness or plasticity to the mix. While it will generally be used in the gun mixes of this invention, its presence is not necessary. The use of the extreme amounts of bentonite (either 0 or 5%) has been found to lead to quicker setting in the gun mix, as compared to intermediate amounts (e.g., 1 or 1.5%). It has also been found that the use of lower amounts of bentonite, e.g., 0 or 1%, leads to a somewhat narrower water range in the composition. (By water range, is meant the range in the amount of water, from high to low, which can be added to the mix and still achieve good gunning, as is well understood in the industry.)

While gypsum is a well-known mineral of the chemical composition $CaSO_4.2H_2O$, it is less commonly used in refractories. It, too, will be used in dry, finely divided form, for example being less than 0.83 mm in size (i.e., all passing a 20 mesh screen). The gypsum used in the present invention is to be distinguished from related materials such as plaster of paris ($CaSO_4.\frac{1}{2}H_2O$) and dehydrated calcium sulfate, sometimes referred to as anhydrite.

In making the gun mix of the present invention, the dry ingredients will be mixed by the refractories manufacturer, bagged, and shipped to the consumer. In use, the dry granular mix will be placed in a gunning apparatus, such apparatus being well-known in the art, preferably of a type wherein water is added to the mix as it passes through a gun nozzle on its way to the surface to which it is being applied.

It is also possible for the gun mix of this invention to contain other ingredients as known in the art. For example, it can contain pitch, preferably hard pitch in pulverized or granulated form, for example 1 to 10% pitch.

EXAMPLE

A gun mix was made from 95.5 parts prereacted sintered magnesia-chrome grain (containing about 61% MgO, 16% $Cr_2O_3$, 7% $Fe_2O_3$, 14% $Al_2O_3$, 1% CaO, and 1% $SiO_2$), 1.9 parts GD sodium silicate ($SiO_2:Na_2O$ ratio=2.0), 1.1 part gypsum, and 1.5 part bentonite. The refractory aggregate was sized so that all was less than 4.7 mm (−4 mesh), and over 20% was less than 44 microns (−325 mesh). The sodium silicate was in granular form, 80% less than 0.15 mm (−100 mesh), the gypsum was all less than 0.83 mm (−20 mesh), and the bentonite 80% finer than 74 microns (−200 mesh).

After these dry ingredients were mixed 5 minutes in a V-Blender, they were gunned through a nozzle mix gun onto a hot furnace wall at 1300° C. The composition gunned excellently with good visibility, good water range, and very little rebound. The same composition, when gunned onto a cold furnace wall, had a good water range and a rebound of 11%. The gunned material had a density of 2.41 g/cc.

Similar compositions with substantially the same bond system (i.e., sodium silicate, gypsum, and bentonite) were made using the following aggregates: (1) all periclase containing about 95% MgO; all chrome ore of the Masinloc Philippine type; a combination of calcined flint clay, mullite aggregate, calcined bauxite and plastic fireclay; a combination of periclase and chrome ore; and a combination of crushed magnesia-chrome brick and periclase. Each of these compositions with widely varying types of aggregate gunned well, had low rebound, in the 10% range, had a good water range, and adhered well, showing that the present bond system is useful with a wide variety of refractory aggregate.

In the specification and claims, percentages and parts are by weight unless otherwise indicated, except that porosities are expressed in volume percent. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 100 mesh screen opening corresponds to 147 microns. Analyses of mineral components are reported in the usual manner, expressed as simple oxides, e.g. MgO and $SiO_2$, although the components may actually be present in various combinations, e.g., as a magnesium silicate.

I claim:

1. A refractory gun mix consisting essentially of from 1 to 5% sodium silicate, from 0.3 to 3% gypsum, and from 0 to 5% bentonite, the balance being refractory aggregate, all percentages being by weight and based on the total weight of the composition.

2. Gun mix according to claim 1 wherein the refractory aggregate is basic refractory aggregate.

3. Gun mix according to claim 2 wherein the refractory aggregate is a magnesia-containing material.

4. Gun mix according to claim 3 wherein the refractory aggregate is prereacted magnesia-chrome grain.

5. Gun mix according to claim 1, 2, 3, or 4 wherein the composition contains about 2% sodium silicate, 1% gypsum, and 1.5% bentonite.

6. Gun mix according to claim 5 wherein the sodium silicate has an $SiO_2:Na_2O$ ratio of about 2.

* * * * *